Patented Feb. 4, 1936

2,029,313

UNITED STATES PATENT OFFICE 2,029,313

PRODUCTION AND APPLICATION OF NEW DYESTUFFS

George Holland Ellis and Frank Brown, Spondon, near Derby, England, assignors to Celanese Corporation of America, a corporation of Delaware No Drawing. Application February 7, 1933, Serial No. 655,616. In Great Britain February 17, 1932

13 Claims. (Cl. 8—5)

This invention relates to the colouration of cellulose ester and ether and other materials and to the manufacture of new dyestuffs for use in this process.

We have found that compounds of the series of arylamino anthraquinones, particularly $\alpha$-arylamino anthraquinones, substituted in the aryl residues by alkoxy or other ether groups, especially when such groups are in the ortho position to the nitrogen atom, are valuable colouring matters for cellulose esters and ethers.

The amino and simple alklylamino derivatives of anthraquinone, for example 1:4-dimethyl-amino anthraquinone, are of value for the colouration of cellulose ester and ether materials in that by their aid it is possible to secure shades of blue difficult to secure by means of other direct dyeing dyestuffs. Many of these dyeings however, while reasonably fast to most of the agencies which textile materials are commonly required to withstand, suffer from a lack of resistance to the combined action of light and acid fumes, for instance combustion products of coal gas. This lack of resistance is particularly objectionable in that in general it involves a considerable change in shade towards red and not merely a reduction in the intensity of the dyeing. The introduction of aryl residues into one or more amino groups of the colouring matters effects in general a marked improvement in the resistance to this acid fading. Thus, 1-amino-4-phenylamino anthraquinone is considerably more resistant than 1:4-dimethylamino anthraquinone though the resistance is still far from absolute. We have found that if the aryl residue in an arylamino anthraquinone for example in a 1-amino-4-arylamino anthraquinone is substituted in the ortho position by an alkoxy or other ether group, a further and marked improvement may be effected in that, though fading may still take place under the influence of acid and light, it is in the direction of a reduction in the intensity of the colour and does not involve any marked change towards red. In consequence any change which takes place under the acidic conditions is far less noticeable, a point of particular importance when the colouring matter is employed in compound shades.

Broadly, therefore, the present invention comprises the colouration of cellulose ester and ether and other materials with arylamino anthraquinone derivatives substituted in the aryl residue, particularly the ortho position thereof, by means of alkoxy or other ether groups. The invention also includes the manufacture of new anthraquinone colouring matters.

The arylamino residues present as substituents in the anthraquinone nuclei may be of any desired character, for example they may be of the benzene, naphthalene, or other series. Preferably however the arylamino residue is of the benzene series.

The ether residues may be in any desired position relative to the amino group, for example ortho, meta or para thereto in the case of a benzene residue. Also the ether residues may be of any desired character, for example phenyl, substituted phenyl or other aryl ether residues. Preferably however ether residues of relatively low mass are employed, for example methoxy, ethoxy or other alkoxy, or a $\omega$-hydroxy ethoxy or other substituted alkoxy residue.

Other substituents may be present in the aryl residues if desired, for example nitro, halogen, alkyl or acidylamino groups. Alkyl groups in the meta position, or acidylamino groups are advantageous in that by their presence an increase in the affinity of the colouring matter for the material may be effected. (Compare application S. No. 655,613 filed February 7, 1933, which describes broadly the manufacture of arylamino anthraquinones containing alkyl groups in meta positions of the aryl radicals and the coloration of cellulose esters or ethers therewith and also application S. No. 655,617 filed February 7, 1933, which describes the manufacture of aryl-amino anthraquinones having acidyl-amino groups as substituents in the aryl radicals and the coloration of cellulose esters and ethers therewith.)

Likewise further substituents may be present in the anthraquinone nuclei particularly amino or aliphatically substituted amino groups. Further, more than one arylamino residue may be present, in which case such further residues may be of the same kind or of different kinds. For example both alkoxy-arylamino groups and unsubstituted or acidylamino substituted or m-alkyl-substituted arylamino groups may simultaneously be present. Particularly valuable dyestuffs are those containing alkoxy-arylamino groups in $\alpha$-positions of the anthraquinone nucleus and amino or aliphatically substituted amino groups or hydroxyl groups in para positions thereto. As examples of specific compounds suitable for use in accordance with the invention mention may be made of 1-amino-4-ortho-methoxy-phenylamino anthraquinone, 1-$\omega$-oxy-ethylamino-4-o-methoxy-phenylamino - anthraquinone, 1-amino-4-(2':5'-dimethoxy - phenyl - amino)-anthraquinone, 1-amino-4-(2'-methoxy-5'-methylphenylamino)-anthraquinone, 1:5-diamino-4:6-di-ortho-methoxy-phenylamino anthraquinone, 1:8-dihydroxy-4-ortho-methoxy-phenylamino anthraquinone and 1-amino-4-ortho-phenoxy-phenylamino anthraquinone.

Any desired methods may be employed for the production of these arylamino anthraquinones substituted in the aryl residue by ether groups, for example, any of the known methods of synthesizing arylamino anthraquinone derivatives. Thus, reactive groups present as substituents in anthraquinone derivatives may be replaced by arylamino residues of the desired character by the action of appropriate alkoxy or other ether substituted aromatic amines. As examples of such aromatic amines may be mentioned o-anisidine, o-phenetidine, amino-hydro-quinone dimethylether, 3-amino-4-methoxy-1-methylbenzene and o-amino-diphenylether. Again, amino anthraquinones may be subjected to the action of agents capable of introducing into an amino group an aryl residue substituted in the desired manner.

As examples of atoms or groups readily replaceable by arylamino residues mention may be made of nitro, hydroxy, amino, chlorine or other halogen atoms, and sulphonic groups. As examples of specific compounds containing such reactive atoms or groups reference may be made to 1-amino-4-hydroxy or alkoxy anthraquinone, 1-amino-4-nitro-anthraquinone, 1-amino-4-brom anthraquinone, 1:4-dihydroxy anthraquinone, 1:5- or 1:8-dinitro-anthraquinone, 4-nitro- or 4-amino-chrysazin, 4-nitro- or 4-amino-anthrarufin, dinitro- or diamino-anthrarufin, dinitro- or diamino-chrysazin, 4-chlor chrysazin or 4-chlor anthrarufin, 1:5- or 1:8-dichlor anthraquinone or their 4-amino derivatives, and 5:8-dichlor-1:2-benzanthraquinone.

In addition to replacing one or more reactive groups by etherified arylamino residues, other of the reactive groups may be replaced by other substituents before or after the introduction of the arylamino residue. Thus, for instance reactive substituents may be replaced by primary amino groups or by alkyl or substituted alkyl-amino groups, e. g. a nitro group may be reduced to a primary amino group or a nitro group, hydroxyl group or halogen atom replaced by an amino or aliphatically substituted amino group by the action of ammonia or an aliphatic amino such as methylamino or oxyethylamine.

If desired instead of introducing etherified arylamino residues into anthraquinone compounds, the ether groups may be introduced into aryl residues of arylamino-anthraquinones. Thus suitable substituents present in the aryl residues may be converted into or replaced by ether groups. For example a hydroxy group may be alkylated or a halogen atom replaced by alkoxy by the action of a sodium alcoholate.

Again the etherified arylamino anthraquinone compounds may be produced by methods involving synthesis or production of the anthraquinone nucleus itself, for example by ring closure of an appropriate substituted benzoyl benzoic acid.

The manufacture of dyestuffs in accordance with the invention is illustrated by the following examples:—

*Example 1*

Preparation of 1:5-di(2'-methoxyphenylamino)-4:8-diaminoanthraquinone.

1 part of 4:8-diaminoanthrarufin is heated with 4 parts of orthoanisidine and 0.5 part boric acid for several hours at the boiling point. The new dyestuff crystallizes out in good yield on cooling, and is filtered off and washed free from o-anisidine and boric acid. It dissolves in most organic solvents with a blue to blue-green coloration.

*Example 2*

Preparation of 1-amino-4-(2'-methoxyphenylamino)-anthraquinone.

1 part of 1-amino-4-methoxyanthraquinone is heated at 160–170° C. with 4 parts of orthoanisidine until no further formation of blue colour takes place. After cooling the new dyestuff is precipitated by the addition of an equal volume of methyl alcohol and is filtered off and dried.

The new colouring matters, as indicated above, are of especial value, particularly when unsulphonated, for the colouration of cellulose acetate and other cellulose ester or ether materials. As examples of such other esters and ethers reference may be made to cellulose formate, propionate or butyrate or the products obtainable by treating alkalized cellulose with esterifying agents, or the ethyl, benzyl or other ethers of cellulose. They may also be applied to mixed materials comprising one or more of the aforesaid cellulose esters or ethers in admixture with other textile fibres, for example wool, silk or other animal fibres, or cotton, regenerated cellulose or other cellulosic materials. Such other fibres may be coloured by the same dyestuffs as the cellulose esters or ethers when they possess the requisite affinity, or they may be coloured either in the same or different shades by means of other dyestuffs, either before, after or simultaneously with the colouration of the cellulose esters or ethers.

The said colouring matters may be applied to textile materials either in the reduced state, that is by a vat process or in the form of free leuco compounds in the manner described in U. S. application S. No. 459,828 filed 5th June, 1930, or they may be applied in solution where sufficiently soluble, in aqueous suspension, or after being brought into colloidal form.

For convenience in application, the new colouring matters may be converted into concentrated or other preparations, whether liquid or solid or semi-solid, in which the colouring matters are present in the reduced or unreduced state and in colloidal, dispersed, or other finely divided condition. Such preparations are included within the scope of the invention and may be prepared for example, by grinding (e. g. in colloid mills), by dissolving in a solvent and mixing with water containing or not containing protective colloids and/or dispersators, or by treatment with dispersing agents whether alone or in the presence of protective colloids and/or liquids e. g. water. Preparations intended for vatting may contain reducing agents, alkali or the like, e. g. alkali salts of hydroxy and polyhydroxy cyclic compounds (see U. S. Patent No. 1,716,720). As examples of dispersing agents or protective colloids mention may be made of the following:—

Sulphoaromatic fatty acid compounds, e. g. sulpho-benzene palmitic acid compounds (see U. S. Patent No. 1,694,413).

Sulphoaromatic ricinoleic acid compounds, e. g. sulpho-naphthalene-ricinoleic acid, (see U. S. Patent No. 1,840,572).

Naphthenic acids or other carbocylic compounds containing salt-forming groups of salts of such acids or compounds (see U. S. Patent No. 1,618,414).

Sulphonated oil compounds, e. g. sulphonated castor oil.

Sulphuric esters of higher aliphatic alcohols.

Furfural-naphthalene sulphonic acid compounds (see U. S. application S. No. 390,423 filed 4th September, 1929).

Resino-naphthalene sulphonic acid compounds (see U. S. application S. No. 390,424 filed 4th September, 1929).

Formaldehyde naphthalene sulphonic acid compounds.

Alkyl-, cycloalkyl-, and aralkyl-naphthalene sulphonic acids.

Sulphite cellulose waste liquor or its constituents or products of transformation, e. g. lignin sulphonic acid compounds.

Sulphonic acid compounds of mineral oils, tar oils, brown coal tar oils, and the like, and their products of condensation with alcohols.

Sulphonic acid compounds of distillation residues of benzaldehyde.

Carbohydrates including gums.

Glue and gelatine.

By addition of or dilution with water, the aforesaid preparations containing unreduced unsulphonated colouring matters yield aqueous suspensions or colloidal solutions which may be directly employed for the colouration of cellulose acetate or other organic substitution derivatives of cellulose. The preparations containing reduced or unreduced colouring matters may be employed for the preparation of dye vats for the colouration of cellulose acetate or other organic substitution derivatives of cellulose or other textile materials.

The coloring matters may be applied to the materials in any desired manner, for example by dyeing or other method of uniform application, or by printing, stencilling or other method of local application. If desired the new colouring matters may be employed for the colouration of stannous chloride discharges in the manner described in U. S. application S. No. 518,897 filed 27th February, 1931.

The colouration of cellulose ester or ether materials with the dyestuffs of the invention is illustrated by the following example:—

*Example 3*

To dye 10 kilograms of cellulose acetate knit fabric a pure blue shade:—

1 kilogram of a paste consisting of one part of finely divided 1-amino-4(2' methoxyphenylamino)-anthraquinone, six parts of water, and 3 parts of Turkey red oil (50%) is heated to the boil with 10 litres of 2.5 g. p. l. soap solution, with stirring, and strained through a filter cloth into a dyebath containing 300 litres of 2.5 g. p. l. soap solution. The previously scoured cellulose acetate fabric is now entered in rope form, and dyeing commenced cold or luke warm, the temperature being raised slowly to 80° C. and maintained thereat for 1½ hours or till the requisite shade is achieved. The goods are now washed off thoroughly and dried or otherwise treated as desired or requisite.

For printing cellulose acetate goods the dyestuff paste is suitably diluted and thickened with a gum thickening paste which may also contain a swelling agent for the cellulose acetate, e. g. methylated spirits. Printing, drying, steaming etc. may be effected in the well known manner. The shades obtained are very resistant to the action of light in the presence of acid and under these influences tend to turn greener rather than redder as is usually the case with blue amino anthraquinone dyeings.

What we claim and desire to secure by Letters Patent is:—

1. Process for the coloration of organic derivatives of cellulose which comprises applying thereto an unsulphonated anthraquinone compound having as a substituent in the anthraquinone nucleus an ether substituted arylamino group of the benzene series.

2. Process for the coloration of organic derivatives of cellulose which comprises applying thereto an unsulphonated o-alkoxy-phenylamino-anthraquinone.

3. Process for the coloration of cellulose acetate which comprises applying thereto an unsulphonated anthraquinone compound having as a substituent in the anthraquinone nucleus an ether substituted arylamino group of the benzene series.

4. Process for the coloration of cellulose acetate which comprises applying thereto an unsulphonated o-alkoxy-phenyl-amino-anthraquinone.

5. Process for the coloration of cellulose acetate which compries applying thereto an unsulphonated 1-amino-anthraquinone having in the 4-position an alkoxy substituted arylamino group of the benzene series.

6. Process for the coloration of cellulose acetate which comprises applying thereto an unsulphonated 1-amino-anthraquinone substituted in the 4-position by an o-alkoxy-arylamino group of the benzene series.

7. Process for the coloration of cellulose acetate which compries applying thereto 1-amino-4-(o-methoxy-phenylamino)-anthraquinone.

8. Organic derivatives of cellulose colored with an unsulphonated anthraquinone compound having as a substitutent in the anthraquinone nucleus an ether substituted arylamino group of the benzene series.

9. Organic derivatives of cellulose colored with an unsulphonated anthraquinone compound substituted in the anthraquinone nucleus by an o-alkoxy-arylamino group of the benzene series.

10. Cellulose acetate colored with an unsulphonated anthraquinone compound having as a substituent in the anthraquinone nucleus an ether substituted arylamino group of the benzene series.

11. Cellulose acetate colored with an unsulphonated anthraquinone compound substituted in the anthraquinone nucleus by an o-alkoxy-arylamino group of the benzene series.

12. Cellulose acetate colored with an unsulphonated 1-amino-anthraquinone substituted in the 4-position by an o-alkoxy-arylamino group of the benzene series.

13. Cellulose acetate colored with 1-amino-4-(o-methoxy-phenylamino)-anthraquinone.

GEORGE HOLLAND ELLIS.
FRANK BROWN.